United States Patent [19]  [11] 3,980,490
Schneider  [45] *Sept. 14, 1976

[54] SOIL STABILIZING AGENT COMPRISING A SULFURIC ACID SOURCE-CALCIUM SOURCE REACTION PRODUCT AND METHOD

[76] Inventor: Gordon L. Schneider, 4214 Cottage Circle No. 3, Las Vegas, Nev. 89109

[ * ] Notice: The portion of the term of this patent subsequent to Apr. 8, 1992, has been disclaimed.

[22] Filed: Mar. 14, 1975

[21] Appl. No.: 558,287

Related U.S. Application Data

[63] Continuation-in-part of Ser. No. 319,455, Dec. 29, 1972, Pat. No. 3,876,439, which is a continuation-in-part of Ser. No. 89,006, Nov. 12, 1970, abandoned, which is a continuation-in-part of Ser. No. 745,957, July 19, 1968, abandoned, which is a continuation-in-part of Ser. No. 508,925, Nov. 22, 1965, abandoned, which is a continuation-in-part of Ser. No. 360,114, April 15, 1964, abandoned.

[52] U.S. Cl. ............................. 106/287 SS; 106/90; 106/274
[51] Int. Cl.² .................. C07G 17/00; C04B 11/14
[58] Field of Search ................ 106/287 SS, 274, 90

[56] References Cited
UNITED STATES PATENTS 3,876,439  4/1975  Schneider ..................... 106/287 SS

*Primary Examiner*—Theodore Morris
*Attorney, Agent, or Firm*—Mason, Kolehmainen, Rathburn & Wyss

[57]  ABSTRACT

Disclosed is a soil stabilizing agent consisting of a source of calcium, such as calcium carbonate, and a spent sulfuric acid having at least about 45% $H_2SO_4$, in a water solution and a method for applying the same. Certain chloride and sulfate materials, such as aluminum and ferric chloride and aluminum and ferrous sulfate, may be added to the soil with the stabilizing agent to provide enhanced results in particular soils. The stabilizing agent is applied with sufficient water to thoroughly wet the soil and thus disperse the agent through the soil and the treated soil is then worked to accomplish thorough mixing. An alternate method application is also disclosed in which the calcium source material, and the chloride or sulfate materials if used, are applied dry in powdered or granular form to the soil surface, the soil and materials are treated with a solution of water and a spent sulfuric acid sufficient to thoroughly wet the soil to the desired depth of treatment and disperse the chemicals therein, and the chemicals and soil are then worked until thorough mixing is assured.

17 Claims, No Drawings

SOIL STABILIZING AGENT COMPRISING A SULFURIC ACID SOURCE-CALCIUM SOURCE REACTION PRODUCT AND METHOD

RELATED APPLICATIONS

This application is a continuation-in-part of my co-pending application Ser. No. 319,455, filed Dec. 29, 1972, and allowed on Oct. 31, 1974, U.S. Pat. No. 3,876,439, which is a continuation-in-part of my co-pending application Ser. No. 89,006, now abandoned, filed Nov. 12, 1970, which is a continuation-in-part of my co-pending application Ser. No. 745,957, filed July 19, 1968 (now abandoned), which is a continuation-in-part of my co-pending application Ser. No. 508,925, filed Nov. 22, 1965 (now abandoned), which is a continuation-in-part of my co-pending application Ser. No. 360,114, filed Apr. 15, 1964 (now abandoned).

BACKGROUND OF THE INVENTION

The present invention relates generally to compounds and methods for stabilizing soils, and more particularly to stabilizing agents and methods for application thereof which are effective in stabilizing finely divided soils such as clays and silts (hereinafter collectively referred to as "finely divided soils").

The construction of roadways, streets, parking lots, aircraft runways and the like of finely divided soils is difficult and expensive because of the inherent instability of such soils. The stabilization of soils with high organic content such as Chernozems, Andos, Brunizems, Podzols, alluvial and bog soils (hereinafter collectively referred to as "organic soils") also present a substantial problem. Some soils, of course, are a combination of both.

For many years a common approach to stabilizing such soil has been to incorporate "borrow" materials into the soil. Gravel and other granular materials, for example, have been commonly used in silts and clays with beneficial results. Crushed rock, because its angular characteristics provided both good support and good drainage, has been widely used as borrow material in all types of soils where it was economically available.

In addition to borrow materials, stability has been enhanced in finely divided soils by the use of line, cement and asphalt. In some cases, these compounds have been used to supplement the borrow materials because of their ability to modify the unstable characteristics of the soil. Cement has proven best in the silts and the very fine sands, while asphalt has been most effective in the coarser sands and for use with rock and gravel borrow materials. Lime has proven to be effective in stabilizing the true clays but unsatisfactory in silts and organic soils.

Lime-fly ash compositions have been utilized to improve the stability of borrow materials containing appreciable quantities of finely divided soils but have proven disappointing as a means of stabilizing true clays and silts, where no appreciable aggregate is present, and soils containing significant proportions of entrained organic residues.

Although all of these materials have helped resolve the difficult and expensive job of stabilizing finely divided soils and organic soils, in one way or another, each has its limitations and a considerable challenge still remains.

Borrow materials, for instance, are frequently not available without transport over great distances, which renders their use quite costly if not totally impractical. Cement and lime, used either alone as an additive to the native soil, or as a supplement to a granular borrow materials, are expensive and difficult to apply in the quantities required. Asphalt is restricted in the more granular types of soil where it is helpful to stability and the lime-fly ash product is not helpful except where certain borrow materials are available.

It has long been evident that the chemistry of a soil has an important relationship to its stability characteristics and that chemically altering a soil can improve its stability. Prior to this disclosure, however, the economical and versatile manner provided has not been available.

The broad essence of the present invention resides in the discovery that applying to a finely divided soil, materials known to have a beneficial effect on the stability of such soils, and particularly a source of calcium (although magnesium or potassium can be quite effective in certain soils) with a reduction-oxidation stimulating compound such as sulfuric acid at concentrations of at least 45% by weight or a spent sulfuric acid, and substantial quantities of water (hereinafter referred to as "reaction product"), initiates rapid and substantial changes in the soil characteristics which greatly enhance its stability. Moreover, such changes can be accomplished even where the quantities of the chemicals applied and the methods of applying them are considerably less costly than the presently known stabilization approaches described above, and provide additional beneficial results including a significant reduction of the plasticity index and a substantial increase in the wet strength. By the addition of certain ancillary products to the reaction product of the invention, particularly certain chloride and sulfate compounds, it is also possible to substantially reduce, or even eliminate, shrinkage and swell of such soils and to reduce the plasticity index even further.

The soil stabilizing agent of the present invention combines certain of the properties of lime, or CaO, with some of those characteristic of asphalt, and at the same time functions as a reducing-oxidizing agent on organic matter in the soil. Because of chemical reactions initiated by the reducing-oxidizing agent, small quantities of calcium and other materials known to be beneficial to soil stabilization can be made to do a job which would require considerably greater quantities under the old approaches. The reaction product is quite compatible with asphaltic materials and can make those materials more effective as well. In sandy soils, the reaction product and asphalt make a particularly effective combination. Of course, my soil stabilizing agent can be effectively employed without asphaltic materials, and in some soil situations should be.

In solving soil stability problems, my reaction product is the key material, and, while by itself it does not materially reduce the shrinkage and swelling of expansive clays, when used in conjunction with certain ancillary products of the present invention it can accomplish this. These other products are essentially mixtures of sulfates in one case and mixtures of chlorides in another. For convenience, the ancillary products will be hereinafter referred to as the "sulfate product" and the "chloride product".

The reaction product is also highly compatible with naturally occurring carbonates. When properly applied, very high stability at low cost is achieved. At times, the use of the reaction product can do a job which is virtually impossible otherwise to accomplish. The use of the ancillary products of the present invention in conjunction with the reaction product can eliminate or rectify soft spots and frost damaged areas.

The following patents were cited against patent application Ser. No. 89,066, filed Nov. 12, 1970:

| | | |
|---|---|---|
| 2,705,681 | Wishlinski | Bituminous Composition and Process of Making It |
| 2,833,663 | Jenkins et al | Method of Making Asphalt Emulsions |
| 2,675,329 | Schuessler | Preparation of Metal Sulfonate Composition |
| 243,167 (Australian) | Samman et al. | Soil Stabilization |

These patents serve to characterize the prior art with which the present invention is clearly contrasted. Each requires a high pH and relies on saponification to achieve its purpose. The present invention requires a low pH, preferably below 2.0, does not involve saponification and achieves markedly superior results for its intended purposes, as will subsequently become apparent. The Brunel Pat. No. 3,400,006 cited against my allowed application Ser. No. 319,455, filed Dec. 29, 1972, relates to the addition of a lubricating oil acid sludge. As set forth later in this application, such sludges contain only about 30% $H_2SO_4$ making them inadequate for the present invention. The Branksy Pat. No. 2,315,044, cited on allowance of Ser. No. 319,455, relates to the addition of sulfuric acid to an acid sludge product.

SUMMARY OF THE INVENTION

It is therefore an object of the present invention to increase the wet strength of finely divided soils, and soils containing substantial quantities of organic residues.

Another object is to reduce the plasticity index of such soils.

Another object is to restrict the speed with which water enters the structure of such soils during periods of wet weather or thawing, and to reduce the speed with which moisutre leaves during periods of dehydration.

Another object is to provide a product and methods for its application which can be used to prevent soil erosion until a vegetative cover can take over.

Another object is to provide a product and methods for its application which are beneficial when applied to load bearing subbases and subgrades in finely divided soils, even when substantial quantities of organic residue are present.

Another object is to provide a product and methods for its application to bases with excessive fines to improve the wet strength thereof.

These and other objects and advantages will be more readily apparent from the following description of a preferred embodiment of the reaction production which is achieved by interacting a source of calcium and a spent sulfuric acid, having at least about 45% by weight $H_2SO_4$. Spent sulfuric acids having less than 45% $H_2SO_4$ can be made usable by the addition of a spent acid of higher concentration, or by adding $H_2SO_4$. The chemical reaction of the constituents is brought about either by adding them to a quantity of water in a mixing tank under conditions which control the addition of the ingredients and the exothermic reaction resulting therefrom, and then applying the product to the soil in predetermined water diluted proportions, or by blending the chosen calcium source and sulfuric acid source into the soil surface separately, in either order. In either case, the reaction product is applied to the soil with sufficient water to thoroughly wet the soil being treated and disperse the reaction product, and is thoroughly mixed with the soil.

DESCRIPTION OF THE EMBODIMENTS

Reaction Product

The naturally occurring carbonates are the principal sources of soil stabilizing materials for finely divided soils, primarily calcium carbonate, $CaCO_3$. Most of these carbonates are utilized as quick lime, $CaO$, or hydrated lime, $Ca(OH)_2$. Calcium carbonate is almost completely insoluble in water and will go into solution only when hydrogen ions or surplus of carbon dioxide molecules are present. Hydrated lime, on the other hand, is completely water soluble.

It is impossible to grind or crush carbonates or lime to a point where they are fine enough to be individual molecular particles. It is also impossible to agitate or stir the particles into the soil mechanically to a point where they can be physically separated molecule by molecule. Nevertheless, it is possible to do this, to a large extent, during the process of formulating the carbonates or lime into a product. This is done in the production of the reaction product of the present invention and results in a soil stabilizing agent greatly superior to calcium carbonate or lime in its ability to stabilize finely divided soils even where organic residues are present in substantial quantities.

The chemical structure of the reaction product is believed to be that of discrete particles or molecules consisting of an atom of calcium, an organic radical with a carbon chain of 12 or more depending upon the type of hydrocarbon present, and a sulfate or sulfonate component being principally sulfonates, all surrounded by a cationic solution of water and organic sulfonates or sulfates that are the surplus or excess added to bring the pH to a low level. The cationic solution surrounding these molecules can contain emulsified particles of oil or asphalt where supplemental quantities of oil or asphalt are added or present in the spent sulfuric acid.

The molecular structure of the product appears to be:

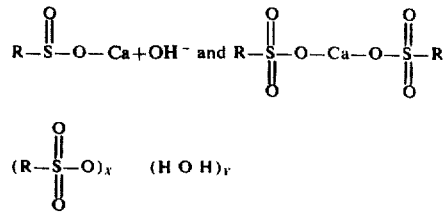

Where R = an aliphatic or aromatic hydrocarbon or a combination of both, and X = a number having a value from about 0.5 to about 1.0, and Y = a number having a value from about 0.5 to about 2.0.

Preliminary to providing specific exmples of the present invention, attention is invited to the meaning of certain terms utilized herein. As they are well known in the art, the following terms are intended to have the following meanings.

"Petroleum oil" — liquid mineral hydrocarbons consisting of mixtures of paraffin, naphthene, and/or aromatic hydrocarbons.

"Asphalt" — bituminous and petroleum tars, oils and pitches utilized in binding aggregate particles in the formation of stabilized soil and road paving.

"Kerosene" — a distillate of petroleum oil having approximately the following characteristics: API gravity, 50 to 35 deg., at 60 F; sp gr, 0.78 to 0.85 at 60/60 F; closed-cup flash point, 100 to 160 F; hhv, 19,400 to 20,200 Btu per lb; distillation range, 200 to 600 F; chemical composition, 85 to 88 percent carbon, 15 to 12 percent hydrogen, up to 0.5 percent sulphur, and, usually negligible percentages of nitrogen and oxygen.

"Diesel Oil" — a distillate of petroleum oil having approximately the following characteristics: API gravity from 40 to 17.5 deg at 60 F; sp gr from 0.82 to 0.95 at 60/60 F; hhv from 18,500 to 20,000 Btu per lb; distillation range from 350 to 700 F or higher; ultimate composition, carbon 85 to 88 percent, hydrogen 15 to 10 percent, sulphur up to 2 percent, combined oxygen and nitrogen up to 2 percent.

"Stove or Fuel Oil" — a distillate of petroleum oil having approximately the following characteristics: API gravity from 40 to 10 deg at 60 F; sp. gr. from 0.82 to 1.00 at 60/60 g; hhv from 18,000 to 20,000 Btu per LB; distillation range from 350 to 700 F and higher; chemical composition, carbon 85 to 90 percent, hydrogen 15 to 8 percent, sulphur up to 2 percent, combined oxygen and nitrogen up to 2 percent.

"Sulfuric acid sludge" — waste or spent sulfuric acid usually resulting as a by-product from refining petroleum oils or benzene. The acid treatment of oils form sulfuric acid sludges is usually performed to improve the color or quality of the oil. During such treatment the acid gradually becomes ineffective as it becomes loaded with various hydrocarbon chain fragments that are seized because they are lacking a hydrogen atom that otherwise would protect the carbon beneath from acid attack. Their formation is described in U.S. Pat. No. 2,705,681. However, in the patent they are neutralized subsequent to formation in direct contrast to their utilization in the present invention. Although sulfuric acid sludge is chemically complex and virtually impossible to define chemically, it is well known in the art. For example, authors kalichevsky and Kobe in *Petroleum Refining with Chemicals* state:

"The composition of sulfuric acid sludges is very complex. Sludges contain many reaction products not found in crude oils and undergo considerable changes in chemical composition on standing. This is demonstrated by changes in the physical appearance of the sludge and by the evolution of sulfur dioxide.

"The sulfuric acid sludges contain sulfuric acid esters, sulfonic acids, salts of nitrogen bases, resinous and asphaltic materials, sulfur compounds dissolved from the oil, hydrocarbon polymers, condensation products and entrained oil. The composition varies with the nature of the crude oil fraction, treating conditions and time of storage. Sludge is an emulsion formed by two dispersed phases included in an organic dispersion medium."

"Spent Acid Sludge and Spent Sulfuric Acid" — a sulfuric acid sludge resulting from petroleum refinery processes, such as alkylation and isomerization. Such processes utilize highly concentrated sulfuric acid. The alkylation process uses a sulfuric acid of 98% concentration, the acid serving as a catalyst in the process. Although the concentrated acid functions as a catalyst during the alkylation process, the acid ultimately becomes diluted by entrained or absorbed hydrocarbons so that the concentration falls below a minimum effective level of 88% to 92%. In such a diluted state it is a brown or mahogany colored fluid liquid that will, upon standing for a period of time, gradually turn purplish or black in color. It is generally designated in the petroleum industry as spent acid sludge or a mahogany sulfonate. Such a spent acid sludge typically has an acidity of approximately 85% to 92% and contains about 4% to 10% hydrocarbons and about 0.1 – 0.3 ash.

"Ash" — the mineral content which remains after a product has been burned.

A preferred embodiment of the reaction product of the present invention is formed by adding calcium carbonate to an adequate supply of water and then mixing in spent sulfuric acid. The order of addition is not critical, however and, for example, the acid source can be added prior to the addition of the calcium source. The spent sulfuric acid should be aged to the stage of its purplish color and must be added at a controlled rate to limit the resulting heat since the reaction is exothermic. Kerosene or diesel oil may be added to limit the vigor of the exothermic reaction and enhance the performance of the product.

The following examples are illustrative of the production of my reaction stabilizing agent.

EXAMPLE I 1,458 parts of water by weight of water. 175 parts by weight of diesel oil. 950 parts by weight of calcium carbonate. 3,058 parts by weight of spent acid sludge of about 78% acidity.

EXAMPLE II

The same as EXAMPLE I except about 210 parts of diesel oil, about 900 parts of calcium carbonate and about 2,752 parts of sulfuric acid (78% by weight) are utilized.

EXAMPLE III

The same as EXAMPLE I except
About 1,666 parts of water
About 140 parts of diesel oil
About 800 parts of calcium carbonate
About 3,058 parts of sulfuric acid (78%).

EXAMPLE IV 12 parts by weight of water
2 parts by weight of kerosene
7 parts by weight of calcium carbonate
12 parts by weight of spent acid sludge which is approximately 80% acid and 10% hydrocarbons
pH attained 1.55
S.G. 1.52

EXAMPLE V 12 parts by weight of water
7 parts by weight of calcium carbonate
10 parts by weight of spent acid sludge which is approximately 55% acid and 30% hydrocarbons
8 parts by weight 66°Baume sulfuric acid
pH attained 1.68
S.G. 1.44

EXAMPLE VI 14 parts by weight of water
8 parts by weight of calcium sulfate
10 parts by weight of spent acid sludge (30% acid and 50% hydrocarbons)
8 parts by weight of 66°Baume sulfuric acid
pH attained 1.56
S.G. 1.48

In EXAMPLS V and VI note no addition of oil and the use of the sulfuric acid and spent acid sludge and the addition of calcium sulfate to control the pH, the calcium sulfate also serving as the calcium source.

EXAMPLE VII 12 parts by weight of water
2 parts by weight of kerosene
7 parts by weight of calcium carbonate
10 parts by weight of spent acid sludge (80% acid and 10% hydrocarbons)

Since sulfuric acid sludges can vary considerably in the amount of sulfuric acid content, only a sludge having a sulfuric acid content of at least 75% can be used when it is the sole source for the acid. However, in order to utilize various spent acids in the interest of economy, especially the sludges resulting from lubricating oil operations, it is possible to adjust the pH of the sludge by substituting sulfuric acid of 60° Baume or higher concentration for sludge to the extent necessary to bring the pH into the desired range, or by substituting sludge containing a higher percentage of sulfuric acid for a portion of the sludge being used in order to accomplish the same result, or by substituting calcium sulfate for calcium carbonate to the extent necessary to reduce the pH to the range desired, or by adding sulfuric acid in conjunction with calcium sulfate to bring the pH to the desired range. The following tabulation indicates steps taken to adjust the pH with representative types of acid sludges. In each instance, the pH of the reaction product is reduced to 2.0 or lower.

For best results, the spent acid sludge is aged to its purplish, purplish black or black condition before use to permit evolution of the continuing reaction occuring between the sulfate and the hydrocarbons to achieve a desirable condition.

TABLE I

| Type of Acid Sludge | % Acid | % Hydro-carbons | Add Oil | Add Acid | Add CaSO₄ |
|---|---|---|---|---|---|
| Alkylation | 85 | 5 | X | | |
| Dichlorodyphcnyl-trichloroethane | 75 | 15 | X | X | |
| Sulfonation | 50 | 25 | | X | |
| Lubricating Oil | 30 | 50 | | X | X |

The lubricating oil acid sludges at room temperature are highly viscous, whereas spent acid sludges are quite fluid. Therefore, when the former are used in the manufacture of the reaction product, it is sometimes necessary to preheat the water and to mix vigorously to obtain a better blending action while introducing the oil and calcium carbonate. When the exothermic reaction begins to raise the temperature, the cooling water should be circulated to hold down the temperature of the mixture.

Various sources of calcium can be employed in producing the reaction product of the present invention. Calcium carbonate — $CaCO_3$, quicklime — $CaO$, calcium hydroxide or slaked lime — $Ca(OH)_2$, are true chemical equivalents except for the absence of one $CO_2$ molecule in the lime and the addition of one molecule of water in the case of slaked lime. Portland cement, which has proven to be as effective as lime, is another source of calcium but is not a true chemical equivalent. The approximate chemical formula for Portland cement is $3CaO.Al_2O_3$. Calcium fluorapatite, which has the approximate chemical formula of $CaF-Ca_4(PO_4)_3$, and calcium phospate — $Ca_3(PO_4)_3$, appeared to be equally effective as sources of calcium. Calcium sulfate (gypsum) — $CaSO_4.2H_2O$, is another source of calcium which is very effective and of great value of those sludges where the sulfuric acid content is low. Calcium chloride was not found to be beneficial, probably because of competition between the sulfur and the chlorine during processing of the product.

In certain types of soils the addition of petroleum oil or asphalt where sulfuric acid is used, or where the acid sludge does not contain an appreciable amount of entrained hydrocarbons, results in a superior reaction product. The best results in certain coarser soils, for instance, was obtained with those reaction products in the above Examples which included the addition of kerosene or diesel oil.

The heavier oils and asphalts have been determined to act as cementing agents in themselves, especially when used in conjunction with the soil stabilizing chemical reaction product of the present invention which has proven to possess the unique ability of dispersing asphalts and tars to a point where they can now be used in clays as stabilizing materials, whereas in the past they have always failed to accomplish such a purpose. This is because the reaction product of the present invention acts as a cationic emulsifying agent for such heavier oils and asphalts. Thus, asphalts are readily emulsified even at average water temperatures. By using asphalt to supplement the action of the reaction product, a low cost stabilization is achieved, especially effective in silts. This high compatibility with asphalts, road oils, and tar in silts and clays is one of the several significant features of the reaction product of the present invention.

From the standpoint of the quality of the finished reaction product, the order of preferred oils utilized in the formation of the reaction product is (1) kerosene; (2) light diesel oil; (3) diesel oil; (4) light distillate oil; (5) distillate oil; (6) gas oil; (7) aviation jet fuel; (8) residual fuel oil or asphalt. That is, beginning with the preferred kerosene, the desirability of these oils decreases as the distillation temperature and the specific gravity of these petroleum products increases. Product from the lighter petroleum fractions, such as gasoline, naphthas, benzene, toluene, xylene, and mineral spirits, are also effective in forming the reaction product of the present invention but their high cost and generally hazardous nature probably preclude their commercial use.

Oil is essential for a good quality reaction product containing spent acid sludges having a low hydrocarbon content. The amount of oil to be added depends upon the amount of hydrocarbons entrained in the acid sludge, which should be at least three percent. The addition of oil is not essential where the amount of hydrocarbons in the acid sludge is equal to or in excess of 20by volume of the total amount of acid sludge used. Preferably, the hydrocarbon content of the finished product should not exceed 30The following table lists acid sludges with different hydrocarbon contents and indicates the minimum amount of oil needed to be added, the percentages being based on a volume relationship and not by weight.

TABLE II

|  | Hydrocarbons | % | Acid, H$_2$O, and Ash | Total |
|---|---|---|---|---|
| Sludge having 5% Hydrocarbon content | .05 | 5% | .95 | 1.00 |
| Add oil - minimum | .20 | — | — | .20 |
|  | .25 | 20% | .95 | 1.20 |
| Sludge having 10% Hydrocarbon content | .10 | 10% | .90 | 1.00 |
| Add oil - minimum | .13 | — | — | .13 |
|  | .23 | 20% | .90 | 1.13 |
| Sludge having 15% Hydrocarbon content | .15 | 15% | .85 | 1.00 |
| Add oil - minimum | .07 | — | — | .07 |
|  | .22 | 20% | .85 | 1.07 |

For quantity production of about 400 gallons of reaction product in accordance with EXAMPLE I, the constituents are intermixed as follows.

175 Gallons (about 1,458 pounds) of water and about 25 gallons (175 pounds) of diesel oil are introduced into a mixing tank. Approximately 950 pounds of calcium carbonate are mixed with the water and oil. Thereafter, while the mixing continues, approximately 200 gallons (3,058 pounds) of spent acid sludge of about 78% acidity and 10% entrained hydrocarbons is added at a gradual rate to prevent excessive temperatures or "boiling over" due to too rapid emission of gases which consist principally of carbon dioxide. The temperature of the mixture in the tank is maintained at a point below 180°F., are preferably in the range of 140° to 150°F. The mixing of the ingredients results in a highly exothermic reaction during which considerable heat is generated, and water vapor with a mixture of gases, including sulfur dioxide, mercaptans and carbon dioxide, are lost to the atmosphere.

As the pH drops with the addition of the acid sludge, the mixture progressively thickens until a pH of 7 is reached. Thereafter, the mixture again becomes more fluid as more acid sludge is introduced and the pH drops lower and lower. Therefore, the amount of water used is that amount necessary to keep the mixture from becoming too viscous at a pH of 7. The amount of yield is about 90% off the total weight of ingredients with the dry solids representing from 17.5% to 20% thereof. The mixing tank is preferably equipped with a coil or jacket, through which cooling water is circulated, and with mixers to assure thorough blending.

METHOD OF APPLYING REACTION PRODUCT

Having described the constituents and the formation for the reaction product, I will now detail the method utilized for applying it to soils. Broadly described, the method consists of first diluting the reaction product with water to form an aqueous solution containing from about 5 to about 25 parts of reaction product per 1,000 parts of water, by volume. Where said conditions indicate it, asphalt to about 3% by weight is added to the reaction product just prior to dilution into the aqueous solution. The surface of the soil, and any base and existing surfacing, are scarified to the desired depth of treatment, usually 4 to 10 inches, before application of the reaction product. The aqueous solution is then applied with reasonable uniformity to the scarified soil surface and mixed in.

The mixing can be accomplished in various ways, but most commonly it is achieved by blading the treated soil back and forth across the treated area. Additional water is added, as required to thoroughly wet the mixture and disperse the reaction product therein, and to bring the soil to a level of moisture content which is optimum for compaction. The determination of optimum moisture content is in accordance with Test Method No. Calif. 216-F as set forth in the publication of the State of California, Dept. of Public Works, Div. of Highways, Materials and Research Department titled "Method of Test for Relative Compaction of Untreated And Treated Soils and Aggregates" published in July of 1963. Optimum moisture content varies for different grades of soil and generally ranges from about 6%–20% by weight. Thereafter, the treated soil is spread evenly over the area and compacted. The spreading can be readily accomplished with a blade grader and the desired compaction is easily achieved by a rubber tired roller, a sheeps-foot, or a steel wheeled roller.

The treated area is then permitted to dry thoroughly, and resurfacing is undertaken, if called for.

EXAMPLE VIII

A soil stabilizing reaction product in accordance with EXAMPLE I was applied to streets with chip and seal surfacing in a North Dakota municipality resting on a deep bed of clay with a plastic index ranging from 20 to 29, which streets had completely disintegrated because of severe winter weather and spring inundation. The streets were scarified to a depth of about eight inches and the reaction product was applied to the scarified soil and surfacing by a water truck during two days in summer, and thoroughly mixed in by blading. Additional water was added to thoroughly wet the soil and after each daily application it rained. Smoothing and compaction were done, when the moisture content of the soil was at its optimum for compaction, by blades and a self-propelled rubber tired roller. There was very little asphalt on the streets and no asphalt or borrow material was added. Following treatment, moisture was evident as far as 18 inches below scarification depth. After a chip and seal surfacing in the fall, the streets weathered a winter which was extremely severe with the frost extending to a depth of six feet on occasion. In the spring there were no soft spots and except for a small frost boil, the streets showed no other signs of distress.

EXAMPLE IX

In Kansas, a two-mile section of asphalt surfaced road on clay with an average plastic index of about 43 was treated with a soil stabilizing reaction product in accordance with EXAMPLE I. Adding 7.5 gallons of the product to each 1,000 gallons of water. 40,000 gallons of solution were made and applied to the road and shoulders. In addition to rain, 34,000 gallons of water were applied during mixing of scarified soil. It was noted that although large quantities of water were added and the soil became slick, equipment was not bogged down and mixing of the soil by blade was easier, drying and compaction of the soil was faster, traffic was getting through with little difficulty, and no rutting occurred from traffic after final compaction even though it later rained.

EXAMPLE X

In Texas, a 1,000 foot section of road, constructed on a black gumbo soil with a sand stabilized shell base 20 feet wide and approximately 4 inches thick, and which had had many subgrade and base failures, was treated with a soil stabilizing reaction product in accordance with EXAMPLE I. The base was scarified, care being taken not to disturb the subgrade. The reaction product was mixed with water at a rate of 5 gallons of product to 1,000 gallons of water and during the course of a summer day was applied to the base at a rate of 1,000 gallons per 5,000 square feet. Following smoothing and drying, base material was added, blade mixed and kept to optimum moisture content by adding water during an even distribution and blend of materials was attained. Compaction was performed by pneumatic rollers in three inch lifts, and intermittent blading was employed to keep a smooth surface. During the following months from September until May there was no movement in the subgrade and only slight unevenness in the surface of the base.

EFFECT OF REACTION PRODUCT ON SOILS

Of the finely divided soils, clays present the greatest problems of stability when they are wet because of their inherent characteristics of poor drainage, high plasticity, load support deficiency and volumetric changes resulting from water absorption and dehydration. Thus, clays support great loads when dry but fail to do so when they are wet.

Initially, tests were made on samples of a California clay with a plastic index of about 20 which had been compacted, dried and subsequently rewetted before determining the effect of different products on the wet strength. Each sample was placed in an extrusion mold and extruded in accordance with equipment and methods covered by A.S.T.M. Designation: D 915-61 after being submerged in water for approximately six hours and drained for 4 hours.

The following tabulations show the proportions of the various ingredients used, the pH of the reaction product at dilutions of 10 parts to 1000 parts water, and the pressure required to make the extrusion in pounds per square inch. For comparison, control pressure readings are shown for clay samples which had not been treated with any stabilizing agent.

TABLE III

THE REACTION PRODUCTS INVOLVING VARIOUS RATIOS OF SLUDGE, WATER, PETROLEUM OILS, AND CALCIUM SOURCES

| Calcium Source | Oil | Water | Spent Acid Sludge | pH | Lbs. Pressure Per Sq. In. |
| --- | --- | --- | --- | --- | --- |
| $CaCO_3$ - 5oz. | None | 5oz. | 5oz. | 7.6 | 108 |
| $CaCO_3$ - 5oz. | 2oz. Diesel Oil | 5oz. | 5oz. | 6.4 | 294 |
| $CaCO_3$ - 5oz. | 2oz. Fuel Oil | 5oz. | 5oz. | 6.8 | 262 |
| $CaSO_4$ - 5oz. | None | 4oz. | 4oz. | 2.1 | 180 |
| $CaSO_4$ - 5oz. | 2oz. Fuel Oil | 4oz. | 5oz. | 1.9 | 264 |
| $CaSO_4$ - 5oz. | 2oz. Asphalt | 4oz. | 5oz. | 1.9 | 347 |
| Portland Cement - 5oz. | None | 5oz. | 4oz. | 9.4 | 231 |
| Portland Cement - 5oz. | 2oz. Fuel Oil | 5oz. | 5oz. | 7.1 | 242 |
| Portland Cement - 5oz. | 2oz. Asphalt | 5oz. | 5oz. | 6.0 | 226 |
| Fluorapatite - 5oz. | None | 5oz. | 5oz. | 6.5 | 246 |
| - 5oz. | 2oz. Fuel Oil | 5oz. | 5oz. | 5.2 | 265 |
| - 5oz. | 2oz. Asphalt | 5oz. | 6oz. | 3.2 | 290 |

TABLE IV

THE REACTION PRODUCTS INVOLVING VARIOUS RATIOS OF COMPONENTS AND HAVING A pH of 2.0 OR ABOVE

| Sample No. | $CaCO_3$ | Added Oil | Water | Spent Acid Sludge | pH | Lbs. Pressure Per Sq. In. |
| --- | --- | --- | --- | --- | --- | --- |
| 1 | 5oz. | 4oz. Kerosene | 2oz. | 8oz. | 5.15 | 238 |
| 3 | 5oz. | None | 4oz. | 9oz. | 2.0 | 200 |
| 4 | 5oz. | None | 2oz. | 8oz. | 7.18 | 164 |
| 6 | 5oz. | 2oz. Asphalt | 2oz. | 8oz. | 7.5 | 228 |
| 49 | 4oz. | 6oz. Kerosene | 2oz. | 16oz. | 6.9 | 201 |
| 54 | 4oz. | 6oz. Fuel Oil | 2oz. | 16oz. | 7.3 | 228 |

TABLE V

THE REACTION PRODUCTS WITH VARIOUS RATIOS OF COMPONENTS AND HAVING A pH BELOW 2.0

| Sample No. | $CaCO_3$ | Oil | Water | Sludge | pH | Lbs. Pressure Per Sq. In. Tests 1 | 2 | 3 |
| --- | --- | --- | --- | --- | --- | --- | --- | --- |
| 2 | 5oz. | 2oz. Kerosene | 8oz. | 6oz. | 1.5 | 459 | 284 | |
| 5 | 5oz. | 4oz. Asphalt | 8oz. | 6oz. | 1.68 | 372 | 186 | |
| 53 | 4oz. | 8oz. Fuel Oil | 20oz. | 8oz. | 1.75 | 369 | 342 | |

TABLE V-continued

THE REACTION PRODUCTS WITH VARIOUS RATIOS
OF COMPONENTS AND HAVING A pH BELOW 2.0

| Sample No. | CaCO$_3$ | Oil | Water | Sludge | pH | Lbs. Pressure Per Sq. In. Tests 1 | 2 | 3 |
|---|---|---|---|---|---|---|---|---|
| 92 | 6oz. | 2oz. Kerosene | 10oz. | 12oz. | 1.40 | 466 | | |
| 95 | 6oz. | 6oz. Diesel Oil | 10oz. | 13oz. | 1.53 | 392 | | |
| 96 | 6oz. | 4oz. Diesel Oil | 13oz. | 10oz. | 1.58 | 349 | | |
| | | CONTROL - NO TREATMENT | | | | 73 | 97 | 55 |

With reference to TABLES III–V, it is readily apparent that those mixtures with a pH below 2.0 were definitely superior than those with a higher pH. Moreover, in comparison with the control samples, all of the mixtures listed increased the wet strength of the soil by a considerable amount.

REACTION PRODUCT WITH ANCILLARY CHLORIDE OR SULFATE COMPONENT

Although the described reaction products of the present invention have helped solve the problems of low wet bearing strength, they increased the permeation rate of water through clay only slightly and reduced shrinkage and swell very little. In searching for solutions to these problems, exhaustive tests were made with clays having a plastic index greater than 30.

Clay/water systems are so complex that little is known about them today in spite of a vast expenditure of time and money in their study. The knowledge present in regard to the effect of various chemicals upon the clay/water system is even more scant. A given metal, such as aluminum, combined as a fulfact causes vastly different characteristics than the same metal combined as a chloride. Therefore, it was necessary that all experimentation and testing proceed on an empirical basis. Two clays were used, one being a Tranquillity clay and the other an expansive, bentonite clay. The tests were conducted as follows.

Each sample consisted of 70 to 75 grams of clay plus the amount and kind of materials hereinafter indicated. Samples were mixed in sets of six, allowed to stand overnight, placed in molds the following afternoon, and then dried under infra red heat lamps overnight. The following morning they were covered with water and allowed to drain for approximately 2 hours in order to obtain test results predicated upon a higher moisture content even though at times a zero pressure reading resulted on untreated samples. The water was then siphoned off, the samples were placed under heat lamps for dehydration, and the swell and general appearance noted. The first pressure reading was taken two to two and one-half hours after siphoning, later readings were made at intervals of 30 to 40 minutes during dehydration. The readings shown are in tons per square foot of kilograms per square centimeter as determined by the use of a Soiltest Model CL-700 Pocket Pentrometer.

The purpose of this series of tests was to determine the relative speed with which soil samples treated with various chemicals in combination with the reaction product would dry out, and how rapidly bearing values would be restored as dehydration continued.

All of the readily available chlorides, sulfates, acetates, nitrates, and hydroxides were tested. Only the chlorides and sulfates showed a degree of compatability with the reaction product. Among them, aluminum chloride — $AlCl_3$, ammonium chloride — $NH_4Cl$, ferric chloride — $FeCl_3$, ferrous chloride — $FeCl_2$, aluminum sulfate — $Al_2(SO_4)_3$, ammonium sulfate — $(NH_4)_2SO_4$, ferric sulfate — $Fe_2(SO_4)_3$, ferrous sulfate — $FeSO_4$, and ferrous ammonium sulfate — $Fe(NH_4)_2(SO_4)_2$ were found to be most beneficial from the standpoint of wet strength, reduction of shrinkage and swell factor, and reduction of plasticity index.

The following tables show the effects of treating, with various materials, samples made up of Tranquillity clay. In TABLES VI through IX the reaction product is in accordance with EXAMPLE VII. With respect to the ancillary products, AlCl represents aluminum chloride, AmCl represents ammonium chloride, FeCl represents ferric chloride, AlS represents aluminum sulfate, AmS represents ammonium sulfate, FeS represents ferric sulfate, and FeAmS represents ferrous ammonium sulfate.

TABLE VI

| SET NO. 167 | FeCl | AlCl | Reaction Product | Pressure Readings | | |
|---|---|---|---|---|---|---|
| 1 | .1 | 2.4 | 2.5 grams | .25 | .9 | 1.75 |
| 2 | .2 | 2.3 | 2.5 grams | .40 | .9 | 2.4 |
| 3 | .3 | 2.2 | 2.5 grams | .40 | 1.1 | 2.25 |
| 4 | .4 | 2.1 | 2.5 grams | .60 | 1.2 | 2.25 |
| 5 | .5 | 2.0 | 2.5 grams | .60 | 1.4 | 2.4 |
| 6 | .6 | 1.9 | 2.5 grams | .60 | 1.5 | 2.6 |

All swelled very slightly.
No. 3 and No. 4 locked best.

TABLE VII

| SET NO. 168 | AmCl | AlCl | Reaction Product | Pressure Readings | | |
|---|---|---|---|---|---|---|
| 1 | .2 | 2.3 | 2.5 grams | .4 | 1.0 | 2.25 |
| 2 | .4 | 2.1 | 2.5 grams | .4 | 1.25 | 2.0 |
| 3 | .6 | 1.9 | 2.5 grams | .45 | 1.30 | 1.8 |
| 4 | .8 | 1.7 | 2.5 grams | .60 | 1.35 | 1.8 |
| 5 | 1.0 | 1.5 | 2.5 grams | .70 | 1.5 | 2.2 |
| 6 | 1.2 | 1.3 | 2.5 grams | .80 | 1.75 | 2.25 |

No. 4, No. 5 and No. 6 did not swell.
No. 3 swelled slightly.
No. 1 and No. 2 swelled moderately.

TABLE VIII

| SET NO. 170 | FeS | AmS | AlS | Reaction Product | Pressure Readings | |
|---|---|---|---|---|---|---|
| 1 | .2 | .2 | 2.1 | 2.5 grams | 1.0 | 2.4 |
| 2 | .2 | .3 | 2.0 | 2.5 grams | 1.2 | 2.8 |
| 3 | .2 | .4 | 1.9 | 2.5 grams | 1.6 | 3.75 |
| | FeAmS | | | | | |
| 4 | .1 | | | 2.4 | 2.5 grams | 1.75 | 3.25 |
| 5 | .2 | | | 2.3 | 2.5 grams | 2.0 | 4.25 |
| 6 | .3 | | | 2.2 | 2.5 grams | 1.6 | 4.25 |

No. 4 did not swell.
Rest swelled slightly.

TABLE IX

| SET NO. 172 | FeS | AmS | AlS | Reaction Product | Pressure Readings | | |
|---|---|---|---|---|---|---|---|
| 1 | .2 | .2 | 2.1 | 2.5 grams | .4 | 1.6 | 2.2 |
| 2 | .4 | .4 | 1.7 | 2.5 grams | .6 | 1.75 | 2.3 |
| 3 | .6 | .6 | 1.3 | 2.5 grams | 0 | 1.5 | 2.6 |
| 4 | .2 | — | 2.3 | 2.5 grams | .25 | 1.4 | 2.3 |
| 5 | .4 | — | 2.1 | 2.5 grams | .40 | 1.75 | 2.75 |
| 6 | .6 | — | 1.9 | 2.5 grams | .50 | 1.9 | 2.7 |

No. 2 and No. 6 did not swell.
No. 3 and No. 5 swelled slightly.
No. 1 and No. 4 swelled moderately.

The aluminum sulfate-iron sulfate mixture is highly compatible with the reaction product and there was a great improvement in wet bearing strength and a substantial reduction in shrinkage and swell when they were used on the soil together. The same is true for the use of the aluminum chloride-iron chloride mixture in conjunction with the reaction product, except that the shrinkage and swell factor is completely eliminated in the more moderate problem clays and substantially eliminated in the expansive clays. In addition to the laboratory tests described above, considerable field testing of the ancillary products was done. These tests indicated that ammonium sulfate when added to the aluminum sulfate-ferric sulfate mixture was found to accelerate the drying time of clays, and ferrous sulfate and chloride were found to be as good and in some cases even better than ferric sulfate and chloride. The chloride mixture appeared to be more beneficial than the sulfate mixture in clays because of its superior ability to reduce shrinkage and swell even though it resulted in slightly lower pressure readings in certain soils. The sulfate mixture is more economical, however, and appears to be more compatible with the use of asphalts and tars. Also, the sulfate mixture is not harmful to plant life, while the chloride mixture could be.

Ferric ammonium sulfate proved to be an excellent constituent for the ancillary products in that it gave excellent pressure readings with minimal shrinkage and swell, however, it was found not to be available in commercial quantities.

PRODUCTION OF ANCILLARY PRODUCTS

Various production runs were made and all test data considered to determine the best compromise obtainable for quality production of the chloride mixture, which is denominated the chloride product for convenience of reference. Based thereon the chloride product was standardized as follows:

EXAMPLE XI

Ancillary Chloride Product 90 gallons (about 959 lbs.) of aluminum chloride (32 °Baume, s.g. about 1.28)
15 gallons (about 181 lbs.) of ferric chloride (45° Baume, s.g. about 1.45)

As for the sulfate mixture, which is denominated the sulfate product for convenience of reference, various quantity production runs and test data were also considered and the product was standardized as follows:

EXAMPLE XII

Ancillary Sulfate Product 750 pounds of aluminum sulfate
150 pounds of ferric sulfate
100 pounds of ammonium sulfate
225 gallons (about 1,874 lbs.) of water Water was used in the sulfate product because the other constituents are normally available in dry form.

The products of EXAMPLES XI and XII appear to have little or no reaction upon one another. However, their use in conjunction with the reaction product of the present invention overcomes many of the problems characteristic of clays and other finely divided soils.

The following table shows the effects of treating samples made up of two-thirds Tranquillity clay and one-third bentonite clay plus a small amount of asphalt. The reaction product is in accordance with EXAMPLE I, the chloride product is in accordance with EXAMPLE XI, and the sulfate product is in accordance with EXAMPLE XII.

TABLE X

| | | Pressure Readings | | | |
|---|---|---|---|---|---|
| 1 | Water only | 0 | 0 | 0 | 0 |
| 2 | Water only | 0 | 0 | 0 | 0 |
| 3 | .6 ml Reaction Product & .6 ml Sulfate Product | 0 | 0 | .5 | .8 |
| 4 | 1.2 ml. Reaction Product & 1.2 ml Sulfate Product | 0 | 0 | .6 | 1.4 |
| 5 | .6 ml Reaction Product & .6 ml Chloride Product | 0 | 0.5 | 1.0 | 1.5 |
| 6 | 1.2 ml. Reaction Product & 1.2 ml. Chloride Product | 0 | .7 | 1.25 | 2.0 |

No. 5 and No. 6 did not swell.
Nos. 3 and 4 swelled slightly.
No. 1 and No. 2 swelled considerably.

TABLE XI is a tabulation showing the correlation between the liquid limit, plastic index, percentage of swell, the penetrometer readings at different times and the extrusion pressures. "RP" represents the reaction product made in accordance with EXAMPLE I. "CP" represents a chloride product made per EXAMPLE XI and the sulfate product is in accordance with EXAMPLE XII and "AS" represents asphalt.

TABLE XI

| 1 lb. Tranquillity Clay | Liq. Limit | Plas. Limit | Plas. Index | Swell | 2hrs | 3hrs | 4hrs | 5hrs | 6hrs | 8hrs | 10hrs | 12hrs | Extrusion Pressure |
|---|---|---|---|---|---|---|---|---|---|---|---|---|---|
| Clay only | 48 | 16 | 32 | 50% | 0 | 0 | 0 | 0.1 | 0.75 | 2.30 | 2.75 | — | 42 |
| 10 ml RP | 44 | 19 | 25 | 50% | 0 | 0 | 0.25 | 0.75 | 2.25 | 3.00 | — | — | 168 |
| 10 ml RP & 10 ml SP | 43 | 29 | 14 | 33% | 0 | 0.15 | 0.50 | 3.25 | 3.60 | — | — | — | 264 |
| 10 ml RP & 10 ml CP | 44 | 24 | 20 | 20% | 0.75 | 1.9 | 3.25 | 4.50 | — | — | — | — | 231 |
| 5 ml RP & 8.25 ml As | 52 | 19 | 33 | 10% | 0 | 0.70 | 1.00 | 1.67 | 2.80 | 3.20 | — | — | 376 |
| 5 ml RP & 5 ml SP & 8.25 ml As | 52 | 23 | 29 | 5% | 0 | 1.00 | 1.50 | 1.95 | 3.50 | 4.50+ | — | — | 487 |
| 5 ml RP & 5 ml CP & 8.25 ml As | 46 | 27 | 19 | None | 1.70 | 2.75 | 4.50 | — | — | — | — | — | 426 |
| 15 ml RP & 15 ml SP | 32 | 26 | 6 | None | 0.25 | 1.25 | 3.25 | 4.50+ | — | — | — | — | 377 |
| 15 ml RP & 15 ml CP | 36 | 26 | 10 | None | 1.25 | 2.75 | 4.50 | — | — | — | — | — | 328 |
| 10 ml RP & 10 ml SP & | | | | | | | | | | | | | |

TABLE XI-continued

| | | | | | | | | | | | | | |
|---|---|---|---|---|---|---|---|---|---|---|---|---|---|
| 8.25 ml As | 46 | 28 | 18 | None | 1.50 | 3.10 | 4.50+ | — | — | — | — | — | 790 |
| 10 ml RP & 10 ml CP & 8.25 ml As | 45 | 31 | 15 | None | 1.75 | 3.50 | 4.50+ | — | — | — | — | — | 642 |

| ¼ lb. Bentonite Clay & ¼ lb. Tranquillity Clay | Liq. Limit | Plas. Limit | Plas. Index | Swell | 2hrs | 3hrs | Penetrometer Readings | | | | 10hrs | 12hrs | Extrusion Pressure |
|---|---|---|---|---|---|---|---|---|---|---|---|---|---|
| | | | | | | | 4hrs | 5hrs | 6hrs | 8hrs | | | |
| Clay only | 82 | 21 | 61 | 100% | 0 | 0 | 0 | 0 | 0.10 | 0.70 | 1.25 | 1.80 | 0 |
| 15 ml RP & 15 ml SP | 53 | 27 | 26 | 50% | 0.50 | 0.75 | 1.75 | 2.30 | 3.00 | 4.50 | — | — | 288 |
| 15 ml RP & 15 ml CP | 48 | 31 | 17 | 20% | 0.60 | 1.60 | 2.50 | 3.50 | 4.50 | — | — | — | 356 |

TABLE X illustrates the degree of control that can be exercised over various types of clays as the result of this invention. The tests were conducted as part of a continuous controlled program. All samples were treated as previously described and tested in accordance with procedures already detailed. The table shows that all of the known undesirable characteristics of clays have been improved or eliminated. Both the drying time and the equilibrium of the moisture was improved. Plasticity index was reduced by raising the plastic limit, or lowering the liquid limit, or both. Bearing strength was recovered in very short time after complete saturation as compared with untreated clays.

FIELD APPLICATION OF REACTION PRODUCT AND ANCILLARY PRODUCTS

In practical application, various amounts of the chloride product and/or of the sulfate product can be used with the reaction product of the present invention for highly advantageous results on clays.

In general, the ancillary products are applied in equal proportion to the reaction product with both being diluted at the rate of 5 to 20 gallons of each product in 1,000 gallons of water. The application rate to the soil is usually 5 to 20 gallons of each product per foot mile of road. As previously indicated, the soil is generally scarified to a depth of 4 to 6 inches, the diluted chemicals applied and mixed with the soil, and the mixture compacted with the soil at optimum moisture content.

The following are specific examples of field application.

EXAMPLE XIII

A reaction product in accordance with EXAMPLE I and a chloride product in accordance with EXAMPLE XI were diluted and applied to the sub-base of a street in a Texas municipality resting on soil consisting of clays with a plastic index of from 40 to 60. After treatment, it was noted that the clay dried out very quickly, became very pliable and crumbly, and that compaction came easily and readily by comparison with usual sub-base soils in the area.

EXAMPLE XIV

In Texas, a 1.7 mile length of asphalt surfaced road resting on clays with plastic index from 40 to 60 was reconstructed employing a reaction product in accordance with EXAMPLE I and a chloride product in accordance with EXAMPLE XI. The asphalt and base were scarified and the base was treated with an aqueous solution containing 5 gallons of each of the product per 1,000 gallons of water which was washed down into the sub-base by additional water. In areas where the base was thin and the clays appeared more troublesome, the amount of each product was doubled. The results of the treatment were considered excellent.

Thus, the reaction product of the present invention has provided a major breakthrough in the stabilization of clays, silts and other finely divided soils. Utilization of the reaction product with the defined chloride product and/or the sulfate product achieves further enhanced results, particularly on clays.

ALTERNATE METHOD OF FORMING AND APPLYING REACTION PRODUCT

Having described the formation and use of my reaction product both with and without the ancillary products, I will now describe an alternative method of forming and using these products.

Although in the previous examples my reaction product and ancillary products were formed in the plant and delivered to the job site as a concentrated solution, it is also possible to achieve the described beneficial results by applying the constituent materials directly to the soil and effecting the reaction during the application. In certain situations substantial economies can result from this alternative method.

To practice the alternative method, for example, I apply a selected source of calcium in dry, powdered or granular form to the surface of a selected area of soil by spreading it to give a mixture with the soil to be treated of about 2 to 10 percent by volume. If the soil surface is in a compacted condition at the time of application, it is scarified before or after application of the calcium to facilitate intermixing of the calcium and the soil. If use of the ancillary products is indicated they are also applied dry and spread over the soil surface.

Next, I apply a water solution of the sulfuric acid or spent acid sludge at a mixture of 1 to 10 gallons of acid or sludge to 1,000 gallons of water, and applied to the soil at a rate of 500 gallons to 1,000 gallons per foot mile.

Thereafter, the reacting constituents and the soil are thoroughly mixed while additional water is applied to achieve thorough wetting of the soil. The water and mixing assure uniform dispersement of the reacting constituents throughout the soil, and the water itself enters into and contributes to the chemical reaction. Liquid asphalt or oils may also be applied where desired, but in climates where freeze and thaw are a problem it should be kept near the soil surface. If desired, the sulfuric acid or spent acid can be added before the calcium source.

When thorough mixing and dispersement of the reactant constituents in the soil has been achieved, and while the moisture content of the soil is at optimum for compacting, the treated soil is compacted. The chemical reaction will continue, however, until the treated soil is thoroughly dried. At this point the improved characteristics of the treated soil will become readily apparent.

Thereafter, rewetting of the soil will not reactivate the chemical reaction, but the soil will evidence an increased wet strength, a lower plasticity index, a substantial reduction in shrink and swell characteristics, where the ancillary products have been used, and greatly improve water absorption and expulsion characteristics.

It should be noted that if additional hydrocarbons in the form of oils or asphalts are indicated, these can be applied with the sulfuric acid or the spent acid sludge, as can additional acid, if the composition of the sludge and the nature of the soil suggest it. Although, as previously indicated, the chemical reaction incited by moisture of the reaction product constituents is exothermic, the generated heat is readily kept within acceptable limits by the mass of the intermixed soil, and at the same time contributes to the speed of the reaction. Because the heat will cause evaporation of the water, greater quantities of water may be required than in my first method of application.

The following are examples of procedures and proportions used in the practice of this alternative method.

EXAMPLE XV

Using as a source of calcium, waste lime from a sugar processing plant, a quarter mile of road 28 feet wide is first scarified to a depth of 8 inches. Then said lime is spread on the road at a rate of 4 tons per mile (one ton of the lime being approximately one cubic yard), and intermixed with said scarified soil by blading the soil and lime with a grader or by use of a pulvimixer. Thereafter, a spent sulfuric acid is intermixed with water at the rate of five gallons of acid to 1,000 gallons of water and applied to the soil and lime mixture at the rate of 500 gallons per foot mile. Additional water is then applied to bring the soil to optimum moisture content for compaction, the mixture is compacted, and allowed to dry thoroughly.

EXAMPLE XVI

Following the same procedure as in EXAMPLE XV, except applying the lime at a rate of 8 tons per foot mile.

EXAMPLE XVII

Following the same procedure as in EXHIBIT XVI, except intermixing said acid and water at the rate of 10 gallons of acid per 1,000 gallons of water.

As these examples suggest, it is not only possible and economically feasible in proper situations to add considerably greater quantities of the reaction product consitituents when this alternative method is used, but since intermixing is accomplished at the job site rather than at the plant, much greter flexibility in tailoring reaction product mix to the particular soil condition being greated is possible.

In certain applications it may be desirable to incorporate borrow materials into the soil at the same time as it is treated with the reaction product. This can be achieved either by spreading the borrow material over the soil surface in the same manner as the dry constituents, or it is possible to premix granular borrow material with the dry constituents and deliver it to the job site in mixed form for spreading.

Although the present invention is described in terms of particular constituents, and ranges thereof, and manner of making and using the same, it is recognized that departures may be made therefrom within the scope of the invention as defined in the appended claims and that all matter in the foregoing description is to be interpreted as illustrative only.

I claim:

1. A soil stabilizing agent comprising: the reaction product of a calcium compound selected from the group consisting of calcium carbonate, calcium fluorapatile, calcium phosphate, calcium sulfate, calcium oxide, and Portland cement and sulfuric acid sludge having not less than 45% by weight acid nor more that 35% entrained hydrocarbons combined in a sufficient quantity of water to maintain fluidity of the resultant product, said constituents being combined in such type and quantity as to provide the reaction product with a pH of less than 7.

2. A soil stabilizing agent as described in claim 1, in which: a liquid hydrocarbon is added to said mixture in an amount less than 10% by weight of said reaction product.

3. A soil stabilizing agent as described in claim 1 in which: said source of acid is a sulfuric acid sludge having not less than 45% acid nor more than 35% entrained hydrocarbons; and said constituents are selected in type and quantity to provide said reaction product with a pH of less than 5.

4. A soil stabilizing agent as described in claim 1, in which: said constituents are selected in type and quantity to provide said reaction product with a pH of less than 2.0.

5. A soil stabilizing agent comprising: the reaction product of 10% to 50% by weight of a source of calcium selected from the group consisting of calcium carbonate, calcium florapatite, calcium phosphate, calcium sulfate, calcium oxide, and Portland cement; said calcium source being intermixed in 20% to 50% water to which is added 20% to 80% by weight sulfuric acid sludge being not less than 60% by weight acid and having not more than 35% by weight entrained hydrocarbons, said constituents being selected as to type and quantity to provide said reaction product with a pH of less than 7.

6. A soil stabilizing agent as described in claim 5 in which: said constituents are so selected by type and quantity as to provide said reaction product with a pH of less than 5.

7. A soil stabilizing agent as described in claim 5 in which: a liquid mineral hydrocarbon is added to the reaction product to comprise not more than 10% by weight thereof.

8. A soil stabilizing agent as described in claim 5 in which: said percentages by weight of said source of calcium in said reaction product are 15% to 25%; said percentages by weight of said sulfuric acid sludge in said reaction product are 30% to 55%; said sulfuric acid sludge is aged to the condition where it is purplish in color; said percentages by weight of said water in said reaction product are 25% to 45%; and said constituents are selected as to type and quantity to provide said reaction product with a pH of less than 3.

9. A soil stabilizing agent as described in claim 5 in which: said source of calcium is calcium carbonate and constitutes 15% to 20% by weight of said reaction product; said sulfuric acid sludge is a spent acid sludge having not less than 80% acidity nor more than 20% entrained hydrocarbons and being aged to the condition where it is purplish to black in color, and said spent acid sludge constitutes 50% to 55% by weight of said reaction product; and said reaction product has a pH of less than 2.

10. The method of forming a soil stabilizing agent comprising the following steps:

first, adding a source of calcium, said source being selected from the group consisting of calcium carbonate, calcium fluorapatite, calcium phosphate, calcium sulfate, calcium oxide, and Portland cement, to a quantity of water sufficient to provide a fluid mixture; and second, adding to said fluid mixture a quantity of sulfuric acid having not less than 45% by weight nor more than 35% entrained hydrocarbons sufficient to reduce the pH of the mixture to below 7, while maintaining said mixture at a temperature of less than 180°F.

11. The method of forming a soil stabilizing agent as described in claim 10, in which: said calcium source constitutes 15% to 25% by weight of the final mixture; said water constitutes 20% to 45% of the final mixture; and said sulfuric acid sludge is a spent sulfuric acid aged to the condition where it is purplish in color and constitutes 30% to 55% by weight of the final mixture.

12. A method of stabilizing soils, comprising: applying to the soil from 2 to 40 parts by volume of a soil stabilizing agent to 1,000 parts by volume of water, said agent comprising the reaction product of a calcium compound selected from the group consisting of calcium carbonate, calcium fluorapatite, calcium phosphate, calcium sulfate, calcium oxide and Portland cement and sulfuric acid sludge having not less than 45% acid nor more than 35% entrained hydrocarbons combined in a sufficient quantity of water to maintain fluidity of the resultant product, with said calcium combined and acid being combined in such type and quantity as to provide the resulting product with a pH of less than 7.

13. A method of stabilizing soils, as described in claim 12, in which: said soil stabilizing agent is applied to the soil in 5 to 25 parts by volume of agent to 1,000 parts by volume of water.

14. A method of stabilizing soils, as described in claim 12, in which: said source of calcium constitutes 14 to 23 parts by weight of the agent and is intermixed with 26 to 29 parts by weight of water and 25 to 54 parts by weight of said sulfuric acid sludge; and said agent has a pH of not more than 2.

15. A method of stabilizing soils as described in claim 13, in which: said agent further includes a source of liquid mineral hydrocarbon.

16. A method of stabilizing finely divided soils as described in claim 15, in which: said soil to be treated is first scarified to the desired depth of treatment; said source of acid is a sulfuric acid sludge having an acidity of at least 45% and a hydrocarbon content of not in excess of 30%; and said mixture is brought to a moisture content optimum for compaction before it is compacted.

17. A method of stabilizing finely divided soils as described in claim 16, in which: said source of calcium is applied in sufficient quantity to constitute a mixture of from 2% to 20% by volume with said soil; and said sulfuric acid is applied to said mixture of calcium source and soil in a water solution comprising 2 to 10 gallons of sulfuric acid to 1,000 gallons of water, applied to said mixture at the rate of 250 gallons to 1,000 gallons per foot mile.

* * * * *